May 5, 1970
G. R. EVANS
3,510,002
ROTARY WATER-FILTRATION APPARATUS, AND
METHOD OF MAKING THE SAME
Filed Dec. 26, 1968
4 Sheets-Sheet 1
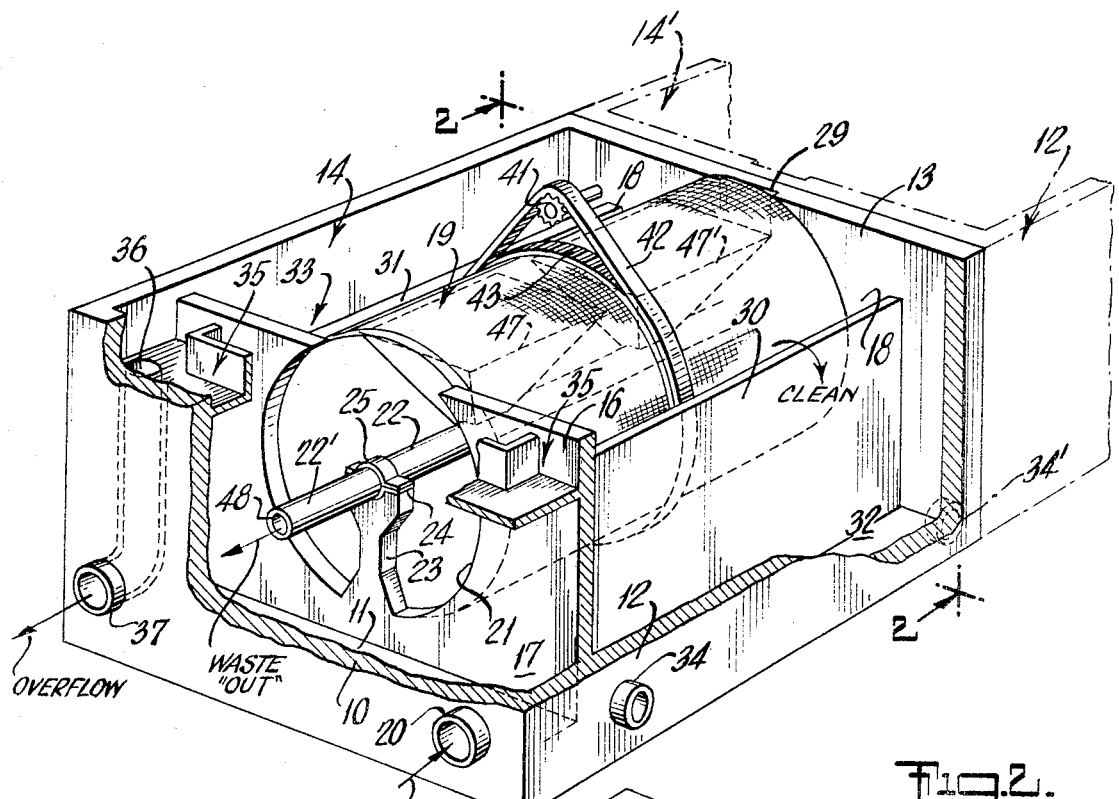
INVENTOR
GEORGE R. EVANS
BY
Hopgood & Calimafde
ATTORNEYS

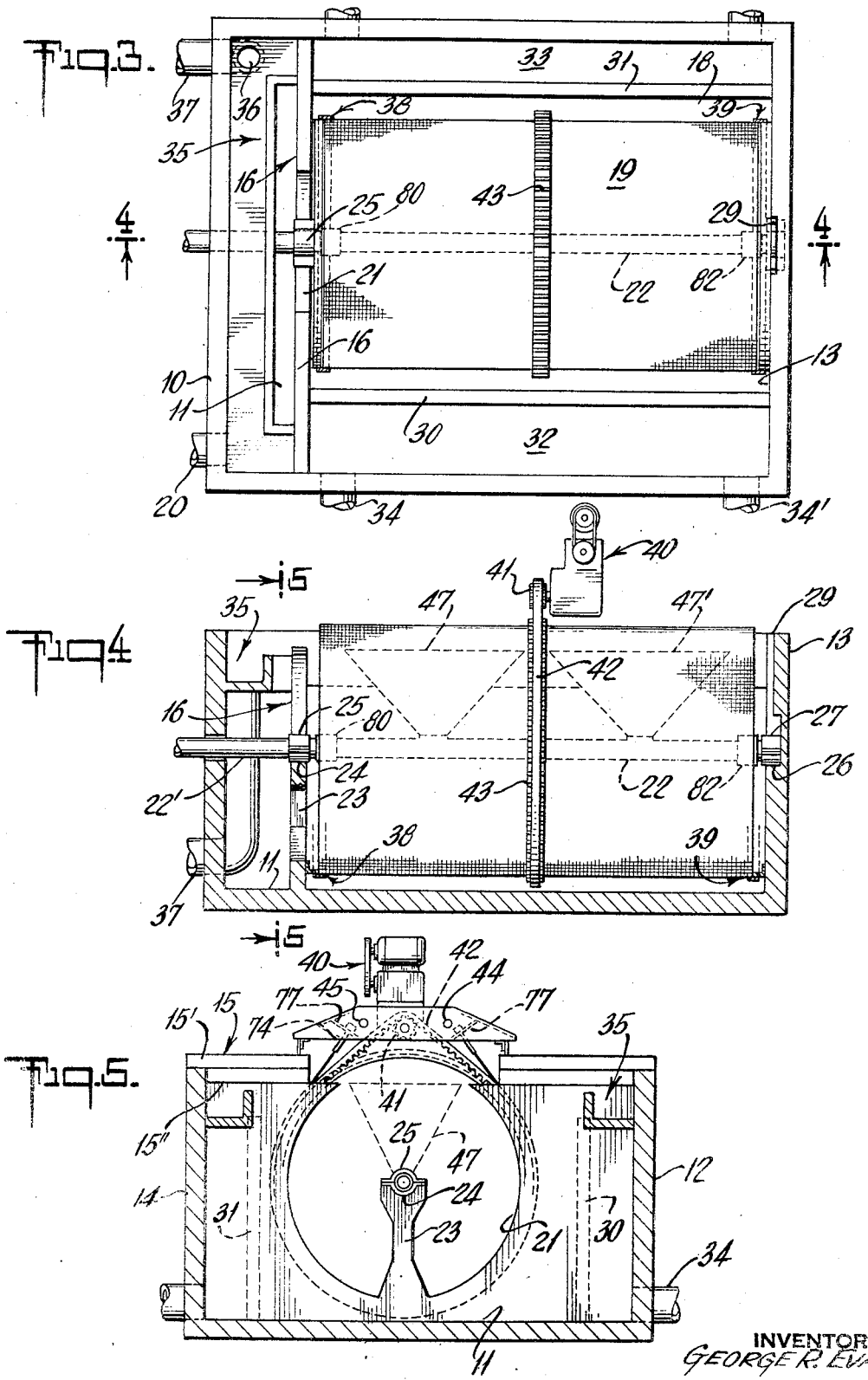

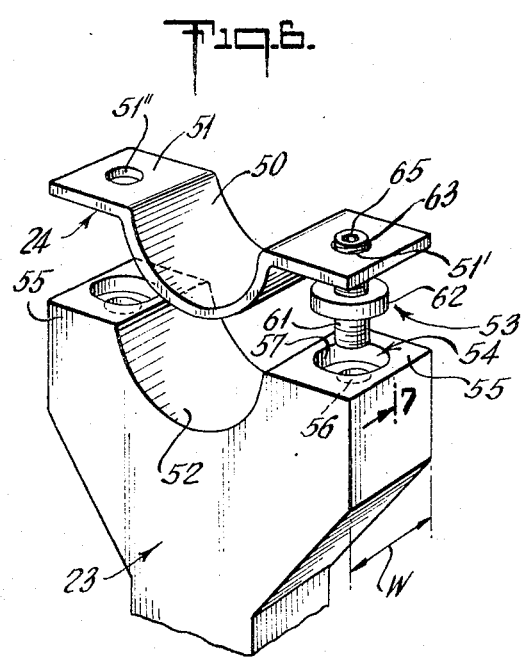
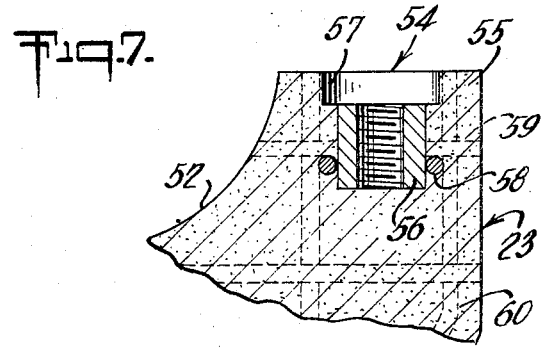
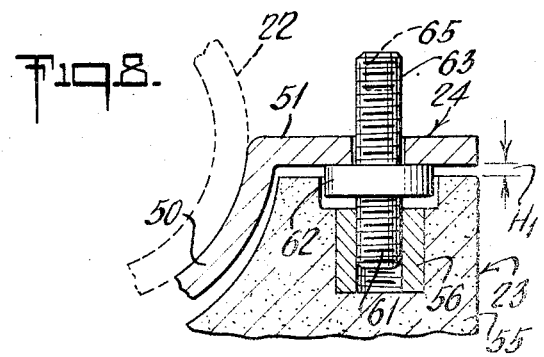
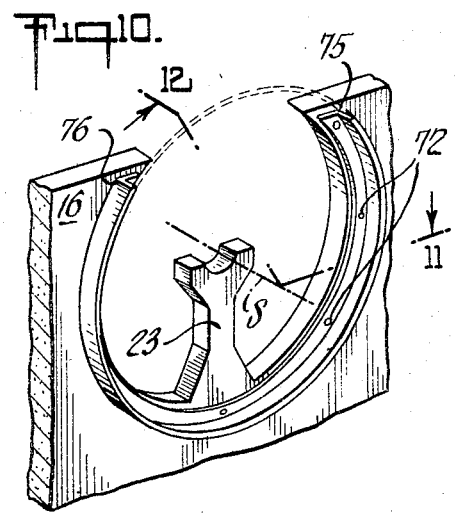
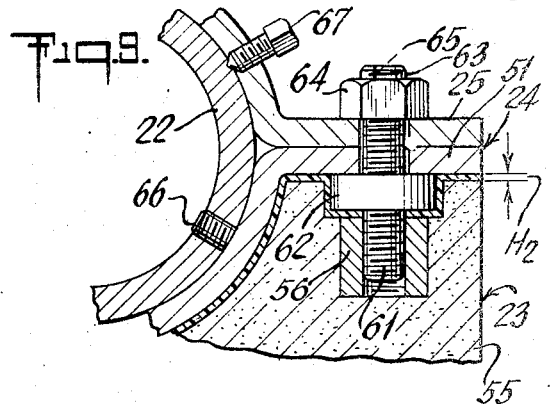
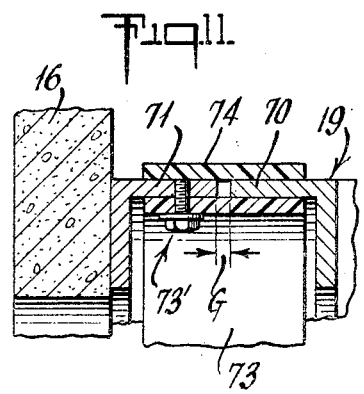
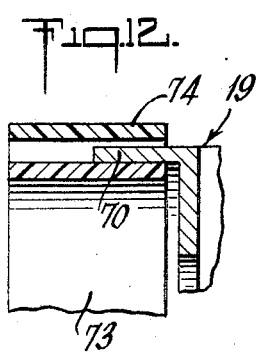
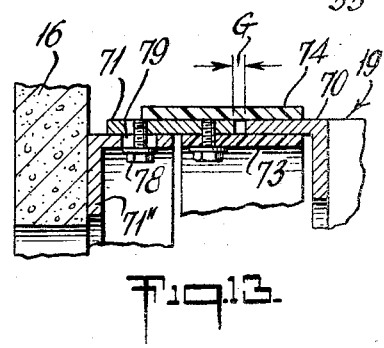
INVENTOR
GEORGE R. EVANS
BY
Hopgood & Calimafde
ATTORNEYS

United States Patent Office 3,510,002
Patented May 5, 1970

3,510,002
ROTARY WATER-FILTRATION APPARATUS, AND METHOD OF MAKING THE SAME
George R. Evans, 58 Nelson Ave.,
Harrison, N.Y. 10528
Filed Dec. 26, 1968, Ser. No. 787,106
Int. Cl. B01d *33/02*
U.S. Cl. 210—232
24 Claims

ABSTRACT OF THE DISCLOSURE

The invention contemplates a rotary-filter system in which the end-support structure, for ultimate support of a filter or strainer drum and its axle, is built or erected at the installation site, of concrete, masonry, iron, steel or other suitable material; such structure may, for example, be integrally cast or molded with the concrete, masonry or the like formation of the basic tank structure into which the strainer is to be installed. The end-support structure is provided in opposed walls of a treatment chamber, and one of these walls is the inlet or upstream wall; in the case of the upstream wall, the support structure is a stool or pedestal extending upwardly at the inlet to the interior of the drum, and at the other end the support structure is formed in or as a part of the opposite end wall. Axle-loaded bed plates are adjustably securable on each end-support structure, to assure correct axle orientation and alignment at the site. Once thus aligned, the bed plates are secured, and the axle is fastened in place with its revolvably mounted drum necessarily also in place. Seal, drive, and other finishing connections are then made.

---

This invention relates to improvements in liquid-filtration, using rotating strainer-drum techniques. While the invention has broad and general application to the filtering of various liquids, it will be described in the context of water-filtration. The references to water herein will thus be understood to be illustrative and not limiting.

My invention deals with certain techniques whereby there may be basic economies and increased efficiency of fluid-filtration on a scale that is or may be substantially expanded for any given installation.

In rotary-drum filter construction, as it is generally known today, the axle, conduit, or support for the strainer drum is carried by a single surrounding frame structure, involving carefully engineered end frames, fitted to the drum and held together by tie-bars, all aligned and assembled at the factory for shipment as a complete assembly. At the installation site, the feet of the end frames are bolted into solid concrete or steel foundations. A concrete, masonry or steel partition is built up to the upstream end frame from the chamber walls on each side of the machine; the downstream end frame is free except for being bolted to the floor.

Such a form of construction needs heavy and strong framing to maintain its shape and dimensions during transportation and during erection at the plant site. It must also be capable of withstanding pressure due to the difference in liquid level between the inside and outside of the drum and the thrust of the incoming liquid against the downstream end frame. As of today, in water-filtration applications, size and capacity limits of such filter constructions appear to have reached an economic limit, with individual rotary strainer assemblies which are in the order of 10-ft. diameter, by 10-ft. long.

It is an object of the invention to provide an improved rotary filter and method of making the same.

Another object is to render possible the economical construction of larger-capacity and more efficient rotary water-filter installations.

It is also an object to provide a rotary water-filtration technique and construction which will offer a greater capacity (i.e., filtered-water volume, per unit time) for a given installation site area, than is obtainable with existing systems, thereby reducing the overall land area required for an installation.

A further object is to provide an improved filter construction which will reduce the danger of contamination of filtered water by raw water.

Still another object is to provide a filter construction and method which lend themselves to later expansion of capacity.

A general object is to meet the above objects with a construction and method which will reduce the assembly, shipping, installation and maintenance costs of a given capacity system, and which will provide higher-grade treatment (i.e., better-filtered liquid) in increased volume, as compared with existing systems and techniques.

Other objects and various further features of novelty and invention will be pointed out or will become apparent to those skilled in the art from a reading of the following specification in conjunction with the accompanying drawings. In said drawings, which show, for illustrative purposes only, preferred embodiments of the invention:

FIG. 1 is a simplified perspective view of a rotary water-filter system of the invention, certain parts being broken-away and shown in section to reveal internal detail;

FIG. 2 is a fragmentary view, similar to FIG. 1 and in the perspective of FIG. 1, but cut generally at the transverse plane 2—2 of FIG. 1, to reveal further internal detail;

FIG. 3 is a simplified plan view of an installation according to FIG. 1;

FIG. 4 is a vertical sectional view, taken on the rotary-axis alignment 4—4 of FIG. 3, certain parts being omitted for clarity;

FIG. 5 is a vertical sectional view, taken in the plane 5—5 of FIG. 3;

FIG. 6 is an enlarged fragmentary perspective view of a bearing support in FIG. 1, parts being simplified and shown in exploded relation;

FIGS. 7 to 9 are fragmentary sectional views in the plane 7—7 of FIG. 6, showing a succession of steps in an installation of the filter system;

FIG. 10 is a fragmentary perspective of a part of FIG. 1, viewed from a different aspect to show seal structure hidden from view in FIG. 1;

FIGS. 11 and 12 are enlarged fragmentary sectional views, taken respectively in longitudinal planes which include the central support axis S of FIG. 10, and respectively taken at radial aspects 11 and 12 in FIG. 10;

FIG. 13 is a view similar to FIG. 11 to illustrate a modification;

FIG. 14 is a simplified view in side elevation, partly broken-away at a vertical section, to show a unit-handling subassembly of the invention, with supporting means for unitary transport and handling; and FIG. 15 is a diagrammatic view in perspective to illustrate multiple unit installation of rotary filters according to a further modification.

Briefly stated, the invention contemplates a rotary-filter system in which the end-support structure, for ultimate support of a filter or strainer drum and its axle, is built or erected at the installation site, of concrete, masonry, iron, steel or other suitable material; such structure may, for example, be integrally cast or molded with the concrete, masonry or the like formation of the basic tank structure into which the strainer is to be installed. The end-support structure is provided in opposed walls of a treatment chamber, and one of these walls is the inlet or upstream wall; in the case of the upstream wall the support structure is a stool or pedestal extending upwardly at the inlet to the interior of the drum, and at the other end the support structure is formed in or as a part of the opposite end wall. Axle-loaded bed plates are adjustably securable on each end-support structure, to assure correct axle orientation and alignment at the site. Once thus aligned, the bed plates are secured, and the axle is fastened in place with its revolvably mounted drum necessarily also in place. Seal, drive, and other finishing connections are then made.

Referring to FIGS. 1 to 5 of the drawings, the invention is shown in application to a basic water-filter tank structure comprising a base floor 10 and upstanding outer walls 11–12–13–14 which extend to the next floor 15 (see FIG. 5); to facilitate installation and maintenance access, the floor 15 may include removable elements, such as prestressed-concrete floor slabs or gratings 15′, supported by suitable framing including beams 15″. The base floor and outer walls may be of concrete, cast at the installation site, as part of the basic foundation of the filter system. Within the tank, a division wall 16, which may also be part of the poured-concrete formation, extends between walls 12–14 to establish an inlet-water chamber 17, apart from a filtered-water or treatment chamber 18, within which a cylindrical filter or strainer drum 19 is revolvable. Drum 19 will be understood to have an external cylindrical filter surface that is determined by the properties of a suitable straining material, such as a fabric of stainless-steel or other filaments, with apertures of the required dimensions, as for example in the order of 20 to 60 microns for certain water-filtering applications. Inlet water ("raw water") enters the inlet chamber 17 at 20 and passes into the interior of drum 19 via an enlarged opening 21, arcuate about the axis of drum 19; in the form shown, the opening 21 terminates at the top edge of the division wall 16, and the drum 19 therefore always includes an upper portion above the upper edge of the division wall.

In accordance with a feature of the invention, the axle or support member 22, upon which drum 19 is revolvably mounted, projects beyond both axial ends of drum 19 and is there secured to spaced bearing-support structures which may be prefabricated of steel, masonry, precast concrete or the like, but which are preferably integrally formed with the basic poured-concrete structure of the tank. In FIG. 1, a first such bearing-support structure, for the left or upstream end of axle 22 is shown as an upstanding stool or pedestal 23, formed as part of the division wall 16 and, therefore, permanently referenced in the foundation. A bed plate or saddle 24 seated at the widened upper limit of pedestal 23 is also firmly referenced and squarely supports the projecting axle end 22′; an anchoring strap 25 clamps the axle end in place, as will be more fully explained later. At its other end (see FIG. 2), axle 22 is squarely supported in a similar bed plate or saddle 26 and clamped by strap 27 at a suitably formed bottom recess of an opening 28 in the outer wall 13. Opening 28 is shown at the lower end of an upstanding groove 29 initially formed in the wall 13 in order to facilitate later integration of the axle 22 and its drum 19 into the installation. The width of groove 29 is at least adequate for clearance with axle 22.

Thus, it is seen that basic support for the drum-and-axle assembly is within the thickness of the opposed walls 13–16 of the treatment chamber. This means that the full longitudinal extent of the treatment chamber 18 is available for the drum 19, and the cylindrical ends of the drum 19 may therefore extend into close adjacency with the support walls 13–16, where peripheral sealing (suggested at 38–39 in FIG. 3) assures that raw inlet fluid (water) will not be permitted to flow into the treatment (filtered-water) chamber 18 via the relatively close wall clearances at the ends of drum 19; the seal construction will be later described, in connection with FIGS. 10 to 12.

To complete the description of the tank construction, retention weirs 30–31 are formed with and extend between walls 13–16 on opposite lateral sides of the drum 19; these weirs determine, with the respective adjacent outer walls 12–14, outlet chambers 32–33, for accumulation of filtered water which spills over weirs 30–31, and one or more outlets 34–34′ may be provided at the bottom of each outlet chamber for externally distributed supply of filtered water. For draw-off of excessive in-flow accumulations, the inlet-chamber walls are formed with a trough system 35, drained at 36 to an overflow exhaust port 37 or through the division wall to mix with the filtered water pending remedial measures or return to normal flow.

In operation, drum 19 is slowly rotated, as by a drive motor 40 and reduction gearing to a pinion or sprocket 41. The drive means 40 is mounted on the upper floor 15, and a toothed-belt connection 42 passes through a floor opening to driven teeth 43 on the drum 19. Inlet fluid ("raw water") in chamber 17 rises to a level above the retention weirs 30–31, as determined by the head required to maintain a steady flow through the filter screen. That part of the filter screen which rises above this fluid level is subjected to wash-water spraying, steam-jet action or other means of cleansing from suitable heads (not shown) at longitudinally spaced locations along the length of supply (wash-water) pipes 44–45 which are carried by bridge structure 46 above the immersed (i.e., upwardly exposed) arc of the strainer drum 19; this wash liquid may be taken as an insubstantial bleed from the already accumulated filtered supply or from some other suitable source. Solid matter dislodged from the upper exposed surface of drum 19 falls down into collection-hopper means 47–47′, for passage through the axle, conduit, or support member 22; member 22 may be plugged, capped or otherwise closed at the opposite end, and an external connection 48 to either or both ends provides exhaust flow for waste effluent.

As generally indicated above, it is an important feature of the invention that the bearing-support structures, at 23–24 and 26, be fabricated and aligned at the site, so that installation proceeds by primarily merely fixing the strainer subassembly into place, at the ends of its axle 22. This means that, prior to securing the strainer subassembly in place, the bearing-support structures will have become a permanent integral part of the tank and its foundation. One method of achieving this is to cast the bearing-support structures into the same concrete as is used to form the described tank walls, weirs and bottom floor, and in such casting the top or upwardly facing bearing-support surfaces are contoured as appropriate to the particular mode of support and attachment of the projecting axle ends. A detailed explanation of the preparation of axle-load bearing structure will be given in connection with FIGS. 6 to 9, for the situation in which a saddle 24 (26) is the bed plate of the support.

In FIG. 6, the stool or pedestal 23 is seen to be of substantially constant width or thickness W, matching that of the division wall 16. At its upper end, pedestal 23 is broadened in cross-section, to accommodate the full extent of saddle 24, which may be a bronze strap in the order of one-half inch thick; having a central semi-cylindrical sling 50 between spaced feet 51. The cast bearing-support region is centrally recessed at 52 to match the saddle shape. For alignment and elevation adjustment, as by a jack screw 53 at each foot 51, the casting of pedestal 23 may also include the formation of suitable jack-receiving recesses 54 in the forked ends 55 which straddle the central recess 52. In the form shown, an internally threaded base socket or insert 56 is molded in each recess 54 at the bottom of a counterbore 57 therein. As seen in FIG. 7, orthogonally related reinforcement members 58–59–60 which strengthen the pedestal at 55 may be secured to each other and to insert 56, thereby integrating insert 56 into the basic wall structure and affording distribution of load sustained at insert 56.

The same basic cast bearing-support formation will be understood to apply at the downstream end, in the accommodation of saddle 26, which may be a duplicate of saddle 24.

The jack screw 53 may be a one-piece element comprising a lower end 61 threaded for engagement with the insert 56, a generally central flange or shoulder 62 for distributed support of the saddle foot 51, and an elongated upper threaded end 63 for extension (with clearance) through foot apertures 51' and beyond the clamp strap, to receive a securing nut 64. A polygonal prismatic recess 65 at the upper end provides wrench access, for jack-screw adjustment, and to permit tight locking action when nut 64 is secured.

Having formed the bearing-support structures as indicated, a bead of hardenable filler, such as an epoxy grout, is applied around the base of counterbores 57, and the base end of a jack-screw 53 is threaded all the way into each socket insert 56. This forces the filler into interstices of the concrete not only at the base of the counterbores 57 but also in the radial clearance between flange 62 and the counterbore, to the extent that excess filler will appear as a circumferential bead around the top edge of flange 62. The upper exposed surfaces at 52–55 are then coated with more filler, and the saddle 24 is set over the projecting screw ends 63. Having thus prepared both bearing-support regions, a complete subassembly of drum 19 and axle 22 is lowered into place with projecting ends 22' resting in the sling 50. The radial clearances of apertures 51' wtih threads 63 will afford automatic axial alignment of the saddle slings, and the weight load of the strainer subassembly will force square seating on and of the saddles, against the yieldability of the filler, as filler is extruded at the saddle edges. When the saddles settle, the local voids or pockets and interstices at the saddle-concrete interface will have filled, and careful level measurements may be made to assure horizontal orientation of the axle. For any slight departure from horizontal, one or more jack-screws 53 is slightly adjusted, until true level of axle 22 is achieved. In the process of such adjustment, the saddle 24 or 26 is slightly raised or lowered from its initial relation to the top surface of pedestal 23. If adustment involves raising a saddle, it will be understood that a peripheral bead of the filler should be continuously supplied around the saddle-concrete interface to assure the void-free ingress of filler as necessary. Once the axle is leveled, the filler may be allowed to harden, under the load of the strainer subassembly. Thereafter, the clamps or straps 25–27 may be applied, and nuts 64 secured. If desired, and as shown in FIG. 9, set screws 66 may be driven from the bore of the axle 22 and against the saddle slings, and outer set screws 67 may be driven from the clamp straps and against the axle, to fix all parts of the setting firmly together and to render the whole as immovable as possible.

It will be appreciated that some of the foregoing procedures do not lend themselves to illustration in all detail. Therefore, for clarity of parts identification, the filler has been omitted from FIG. 8, where an exaggerated adjusted elevation H1 is shown. On the other hand, filler 68 is shown in FIG. 9, where all parts are secured in place for a lesser elevation H2.

It will be appreciated that the described leveling and filling technique, involving insertion of and loading by the complete strainer subsassembly is purely illustrative, because for certain large installations it may not be convenient to handle this subassembly as a unit. For example, it may be in certain cases more practical to secure the saddles to the concrete or other pedestal formation and then to machine the slings 52 in situ, for aligned level reception of the tubular support or axle 22, to which the drum structure 19 is subsequently assembled in situ. Further alternatively, it may be desired to secure the saddles in place at predetermined accurately aligned points of elevation, preparatory to later reception and clamping of the axle; and the drum may be preassembled to the axle, or assembled to the axle after the latter has been clamped in situ. In any event, the described method, involving formation of bearing supports at tank walls and at the site, assures the achievement of stress-free mounting of the strainer drum and axle, in perfectly rigid and permanent horizontal orientation.

Having correctly secured the strainer and axle, the installation proceeds by establishing the end seals 38–39, which will be described primarily in reference to FIGS. 10 to 13. Basically, at each longitudinal end of the strainer drum 19, the seal between raw inlet water (within drum 19) and filtered water (outside drum 19) is achieved by belts of flexible material riding similar cylindrical flange surfaces and spanning a short axial gap between such surfaces. In FIG. 11, such a flange is illustrated as part 70 of the rotating drum 19, establishing a circumferentially continuous peripheral rim which extends axially toward the adjacent tank wall (division wall 16). As a separate non-rotated seal part, a similar flange 71 is secured, as by means 72 to the tank wall 16, using filler (as already described) to assure water-tight integrity in the fitting of flanged member 71 to the wall 16. Flanged member 71 is formed to match the thickness and radius of drum flange 70, with a short axial gap G between flanges. Flange member 71 is of limited arcuate extent, terminating at substantially division-wall height. For mounting flexibility, member 71 includes radial-clearance provision with respect to securing means 72, so that upon securing the same there may be such local adjustment of member 71 as to assure elimination of any eccentricity with respect to the drum axis. Having assured the described concentric match of the two flanges 70–71, a first seal strip 73 of flexible material, such as a continuous belt of polyvinylchloride, is laid in overlapping relation with the corresponding inner cylindrical surfaces of both flanges. Belt 73 may be secured to one or the other of flanges 70–71; and, preferably, belt 73 is secured (as suggested at 73', FIG. 11) to the flange 71 carried by the end wall.

The seal is completed by the tensed circumferential application of a second strip 74 of flexible material around the outside surfaces of flanges 70–71. This circumferential overlap applies for the totally immersed region of the seal but departs tangentially therefrom, for non-rotational frame reference above the raw-water level, i.e., from points on flange 71 near and preferably short of the arcuate limits 75–76 thereof. Frame reference for the outer belt 74 is established at suitable brackets 77 on the upper-floor bridge structure 46 (FIG. 5); and it will be understood that spring-tensioning means (not shown) may be incorporated in one of the belt connections to bridge 46.

FIG. 13 is a view similar to FIG. 11 to illustrate a preferred adjustable feature for establishing the described seal relationship. Briefly, this involves two-part formation of the fixed or non-rotated flange structure 71; in FIG. 13, these two parts are seen as a collar 71' having a telescoping adjustable fit with the cylindrical part of the mounting flange 71". Bolts 78 pass through longitudinally slotted regions 79 in the cylindrical part of flanged member 71" and set in tapped radial holes in collar 71'. In practice, the assembled drum 19 is machined to a single radial plane at its axial end of flange 70, then after securing flange 71" to the division wall, collar 71' is adjusted as necessary to produce a narrow uniform gap G, at which point the bolts 78 are set. Next the inner seal belt 73 is secured, and then the outer belt 74, as already described.

FIG. 14 illustrates the subassembly of drum 19 and its axle or support member 22, as a separate article of manufacture which, within convenient size limitations, represents the sum total of factory assembly necessary in the practice of my invention. This subassembly includes the hopper means 47–47' for waste effluent, and the longitudinally spaced anti-friction bearings 80–81–82 by which axle 22 supports the radial structures or skeletons 83–84–85 of the drum. In the drawing, sectioning of the drum periphery suggests that this subassembly may be complete with installed filter screening. For shipment, a suitable support jig or crating base may include spaced rugged pedestal uprights 86–87 on a platform 88, the support being primarily at the axle ends, although other removable cross-bracing, suggested at 89–90 and firmly diagonally referenced to the pedestals 86–87, may assure integrity of support during shipment. A protective outer crating enclosure 91 may complete the primary packing requirements.

It will be apparent that, by eliminating the need for factory assembly with end frames, tie-rods and the like, my invention permits lighter-weight shipments for larger-capacity systems, and that the danger of shipment damage is materially reduced, as compared with past and current techniques. Since the basic supporting frame is integral with the tank, being erected at the site, there is no frame to be damaged on shipment. Since alignment and orientation are carefully tailored at the site, there is none of the excessive stressing of joints which, in existing systems, presents the danger of parts dislocation under conditions of prolonged use. Such dislocations may go undetected for some time and when found, are not easy to correct. They cause undue wear on moving parts such as drum bearings and gear teeth and may split the strainer fabric which is stretched over the drum.

In general, it will be seen that I have disclosed a filter construction and technique which represents important further advances, by overcoming difficulties of existing rotary filter units, and by providing economy and efficiency of filtration, as well as enhanced flow-rate capabilities. Specifically, as a result of my new construction and technique, the following benefits accrue:

(1) Certain limitations which previously had been considered inherent in rotary filters are no longer applicable;

(2) The overall cost of the whole filter installation is reduced;

(3) The factory cost of the equipment itself is reduced—far more than that required to offset the increased wall or foundation-construction costs;

(4) The cost of transportation from factory to site is reduced;

(5) Erection time (i.e., labor) is reduced, owing to the simplification of construction and erection procedure;

(6) Maintenance costs are less, since the installed assembled equipment is simpler, lighter, and less susceptible of distortion and damage, and parts may be more readily replaced and serviced;

(7) The space required for a complete installation is much less than if the current method is used;

(8) The production of much longer (and otherwise larger units than heretofore made is now economically possible. For example, in certain cases two of the largest units currently made could be replaced by one machine built by my method, without reducing the combined effective filtration area; yet only one power and only one control unit would be required for the total larger unit of my invention;

(9) The basic tank layout, with filtered-water weirs on opposite longitudinal sides of the drum axis, offers the opportunity of readily doubling the capacity of any given installation, by merely installing a mirror-image tank system which may use the downstream wall 13 as the common downstream wall of both systems; in FIG. 1, the phantom wall outlines 12'–14', and the insertion recess 29', suggest the general layout and orientation of such as expanded, capacity-doubling installation; and

(10) The basic tank layout, with filtered-water weirs on opposite longitudinal sides of the drum axis, further offers the opportunity of efficient layout in multiple, using both ends of the drum as water inlets. Such a layout is schematically suggested in FIG. 15, wherein plural drums 95–95'–95" are arrayed in spaced parallel relation, being served by raw-water inlets at division walls 16–16' on opposite ends of each drum. The basic raw-water inlet 96 is divided into branch feeder channels 97–97' serving the division wall inlets at opposite ends of all drums 95–95'–95". Filtered water, collected over the two retention weirs associated with each of the drums 95–95'–95" is collected by various drains 98–98'–98"–98''', forming branches of the treated-water outlet line 99; between adjacent drums 95–95', the collection chamber 33 serves filtered water spilled over weir 31 from drum 95 and over weir 30' from drum 95. It will be understood that further banks of drums, as suggested by phantom outline at 100–100'–100", may be similarly arrayed, in longitudinally spaced relation to the bank 95–95'–95", and utilizing raw-water inlet channels (as at 97') in common with the adjacent bank (95–95'–95").

What is claimed is:

1. The method of erecting a rotary fluid-strainer at its permanent-installation site, comprising the steps of: molding in situ a permanent concrete tank defined by outer walls and divided by a division wall between an inlet or raw-fluid chamber and an outlet or fluid-treatment chamber, the division wall extending in spaced substantially parallel relation to an outer wall on the opposed side of the treatment chamber, the division wall having a large generally central opening communicating between said chambers, forming with the concrete structure of said tank a first elevated strainer-bearing support structure and a second elevated strainer-bearing support structure respectively in aligned generally central regions of said outer wall and said division wall, selecting a cylindrical strainer structure with its central elongated bearing conduit having support regions projecting axially beyond both axial ends at the spacing of said respective support structures, and assembling in situ said strainer with its support regions into horizontally aligned supported relation with said support structures.

2. The method of claim 1, in which the formation of said support structures is to an elevation short of that required for the desired ultimate alignment of the support regions of said strainer; said method comprising the additional steps of selecting rigid bearing members for ultimate direct support of said support regions, temporarily supporting the rigid bearing members in their desired ultimate aligned elevation, such temporary elevation being to the point of establishing a clearance between at least one of said bearing members and its bearing support structure, packing said clearance with a hardenable permanent support filler, and securing the support regions of said strainer structure in final position on said bearing members after such filler has hardened.

3. The method of claim 1, and including the subsequent step of establishing peripheral seals between each strainer end and the adjacent wall, the seal at the division wall continuously surrounding the opening between chambers at least to a point above the normal operating level of fluid in the inlet chamber.

4. The method of claim 1, in which the molding of said tank includes the integral formation of a retention weir extending between the division wall and said outer wall, said weir being on one lateral side of the cylindrical strainer structure so as to provide at said lateral side an outlet chamber for spill fluid from the treatment chamber.

5. The method of claim 4, in which the molding of said tank includes the integral formation of a second retention weir extending between the division wall and said outer wall and on the opposite lateral side of the cylindrical strainer structure so as to provide at said opposite lateral side a second outlet chamber for spill water from the treatment chamber.

6. A fluid strainer, comprising a permanently installed concrete tank defined by outer walls and divided by a division wall between an inlet or raw-fluid chamber and tn outlet or filtered-fluid chamber, said division wall extending in spaced substantially parallel relation to an outer wall on the opposed side of the filtered-fluid chamber, said division wall and said opposed outer wall each having a generally central opening, the openings being at least in part at levels below the normal operating level of fluid in the inlet chamber, bearing-support structure in the concrete formation of each of said division and opposed outer walls and establishing aligned bearing-support levels at both openings and below the normal level of water in the inlet chamber, an elongated support member secured at spaced locations to both said bearing-support structures, an elongated cylindrical strainer drum rotatably mounted on said support member between said support structures, means for rotating said strainer drum, and peripheral seals at the respective axial ends of said drum and rotatably sealing said ends with respect to the adjacent wall surface, said seals surrounding the adjacent wall openings at least up to an elevation above the normal operating level of fluid in the inlet chamber.

7. A fluid strainer, comprising a permanently installed foundation including a concrete tank defined by outer walls and divided by a division wall between an inlet or raw-water chamber and an outlet or treatment chamber, said division wall extending in spaced substantially parallel relation to an outer wall on the opposed side of the treatment chamber, said division wall having a generally central opening providing communication between said chambers at less than remaining division-wall height; said division wall including, in the concrete formation thereof, a first upwardly-facing bearing support within the span of the opening; said opposed outer wall including, in the concrete formation thereof, a second upwardly-facing bearing support, and said bearing supports establishing aligned bearing-support levels below the normal operating fluid level in the inlet chamber; an elongated support member secured at spaced locations to both said bearing supports, an elongated cylindrical strainer drum rotatably mounted on said support member between said supports, means for rotating said strainer drum, and peripheral seals at the respective axial ends of said drum and rotatably sealing said ends with respect to the adjacent wall surface, said seals surrounding the regions of bearing support and the division-wall seal surrounding the division-wall opening at least up to an elevation above the normal operating fluid level in the inlet chamber.

8. The strainer of claim 7, in which the chamber surface of said opposed outer wall has a vertical groove of width greater than the effective width of said support member, the groove extending continuously upward from the upwardly facing bearing support in said opposed outer wall.

9. The strainer of claim 7, in which the concrete formation of each of said bearing supports is generally saddle-shaped, a saddle insert overstanding each of said supports, and means for adjustably elevating and aligning one of said inserts with respect to the other, said support member being secured to said inserts.

10. The strainer of claim 9, in which the means for adjustably elevating and aligning said one insert includes screw-jack mechanism coacting between said one insert and its concrete bearing support.

11. The strainer of claim 7, in which separate straps transversely overstanding said tubular support member at each bearing-support structure are clamped to said bearing-support structures to secure said support member.

12. The strainer of claim 10, in which said screw-jack mechanism includes an upwardly facing open socket bearing element molded in the concrete of the applicable bearing support.

13. The strainer of claim 7, in which the division-wall end of said drum includes a circumferentially continuous cylindrical flange extending axially toward said division wall, similarly flanged means secured to said division wall and of limited but otherwise circumferentially continuous arcuate extent, said flanged means including a cylindrical flange of thickness and radius matching that of the drum flange and in clearing edge-to-edge axially aligned adjacency therewith, tank-mounted frame structure overstanding the division-wall supported end of said drum, and a flexible strap of low-friction sealing material overlapping adjacent outer cylindrical surfaces of said flanges and having ends connected to said frame structure.

14. The strainer of claim 13, in which the strap-end connections to said frame structure depart substantially tangentially from contact with said flanges within the arcuate limits of said division-wall mounted flange.

15. The strainer of claim 13, in which said flanged member includes a radially extending flange secured to said division wall, said radial flange and said division wall including coacting means for adjustably positioning the axis of said flanged member to coincide with the drum axis.

16. The strainer of claim 13, in which said flanged means comprises a mounting member secured to said division wall and having a cylindrical flange, and a collar having telescoping fit with said last-mentioned cylindrical flange, said collar being adjustably secured to said mounting member in closely spaced edge-to-edge adjacency with said drum flange.

17. A fluid strainer according to claim 7, in which said first upwardly-facing bearing support includes an upstanding concrete pedestal integral with said division wall.

18. A fluid strainer according to claim 7, in which said tank includes a retention weir extending between said division wall and said opposed wall, said weir being on one lateral side of said strainer drum and spaced from the adjacent outer wall, thereby providing at said lateral side an outlet chamber for water spilling from the filtered-fluid chamber.

19. A fluid strainer according to claim 18, in which said tank includes a second retention weir extending between said division wall and said opposed wall, said second weir being on the opposite lateral side of said strainer drum and spaced from the adjacent outer wall, thereby providing at said opposite lateral side a second outlet chamber for water spilling from the filtered-water chamber.

20. A fluid strainer according to claim 18, in which said division wall has a by-pass such as a pipe opening from the inlet chamber to the outlet chamber.

21. A fluid strainer, comprising a permanently installed foundation including a concrete tank defined by outer walls and divided by a division wall between an inlet or raw-fluid chamber and an outlet or filtered-fluid chamber, said division wall extending in spaced substantially parallel relation to an outer wall on the opposed side of the filtered-fluid chamber, said division wall having a generally central opening providing communication between said chambers at less than remaining division-wall height; a first upwardly-facing bearing support within the span of the opening and directly and firmly referenced to said foundation at said division wall; a second upwardly-facing bearing support directly and firmly referenced to said foundation at said opposed outer wall; an elongated support member secured at spaced locations to both said bearing supports, an elongated cylindrical strainer drum rotatably mounted on said support member between said supports, means for rotating said strainer drum, and peripheral seals at the respective axial ends of said drum and rotatably sealing said ends with respect to the adjacent wall surface, said seals surrounding the regions of bearing support and the division-wall seal surrounding the division-wall opening at least up to an elevation above the normal level of water in the inlet chamber.

22. A fluid strainer, comprising a tank having a fluid inlet and defined by outer walls and a treatment chamber defined by walls within said tank, said treatment chamber walls comprising two spaced generally parallel division walls each of which has an enlarged opening providing communication between said treatment chamber and the fluid inlet to said tank at less than remaining division-wall height; an upwardly facing bearing support within the span of each opening and directly and firmly referenced to said tank at each division wall, an elongated support member spanning said treatment chamber and secured at spaced locations to both said bearing supports, an elongated cylindrical drum rotatably mounted on said support member between said supports, means for rotating said strainer drum, and peripheral seals at the respective axial ends of said drum and rotatably sealing said ends with respect to the adjacent division-wall surface.

23. A strainer according to claim 22, in which each said division wall has a like plurality of such enlarged openings in like transversely spaced array, and in which each pair of opposite openings is similarly provided with such bearing supports, a separate support member mounted on the bearing supports of each such pair, and a separate strainer drum revolvably mounted on each support member and rotatably sealed at its axial ends to the adjacent division-wall surface.

24. A strainer according to claim 23, in which separate spaced retention weirs connect said division walls in the space between adjacent drums, thereby defining a collection chamber serving treated fluid from both said adjacent drums.

References Cited

UNITED STATES PATENTS 2,148,903  2/1939  Garnsey _____ 210—394

REUBEN FRIEDMAN, Primary Examiner

T. A. GRANGER, Assistant Examiner

U.S. Cl. X.R.

210—253, 326